United States Patent
Sinchev et al.

(10) Patent No.: US 11,546,142 B1
(45) Date of Patent: Jan. 3, 2023

(54) CRYPTOGRAPHY KEY GENERATION METHOD FOR ENCRYPTION AND DECRYPTION

(71) Applicants: Bakhtgerey Sinchev, Almaty (KZ); Askar Sinchev, Nur-Sultan (KZ); Zhanna Akzhanova, Nur-Sultan (KZ); Talgat Aldybergenov, Nur-Sultan (KZ)

(72) Inventors: Bakhtgerey Sinchev, Almaty (KZ); Askar Sinchev, Nur-Sultan (KZ); Zhanna Akzhanova, Nur-Sultan (KZ); Talgat Aldybergenov, Nur-Sultan (KZ)

(*) Notice: Subject to any disclaimer, the term of this patent is extended or adjusted under 35 U.S.C. 154(b) by 0 days.

(21) Appl. No.: 17/559,944

(22) Filed: Dec. 22, 2021

(51) Int. Cl.
*H04L 9/08* (2006.01)
*H04L 9/14* (2006.01)
*G06F 12/14* (2006.01)
*G06F 21/62* (2013.01)

(52) U.S. Cl.
CPC .......... *H04L 9/0825* (2013.01); *G06F 12/145* (2013.01); *G06F 12/1408* (2013.01); *G06F 12/1441* (2013.01); *G06F 21/6227* (2013.01); *H04L 9/0866* (2013.01); *H04L 9/14* (2013.01)

(58) Field of Classification Search
CPC ............. G06F 12/1408; G06F 12/1441; G06F 12/145; G06F 21/6227; H04L 9/0825; H04L 9/0866; H04L 9/14
See application file for complete search history.

(56) References Cited

U.S. PATENT DOCUMENTS

| | | | |
|---|---|---|---|
| 5,577,124 A | * | 11/1996 | Anshel .................. G06F 7/582 713/168 |
| 6,070,157 A | | 5/2000 | Jacobson et al. |
| 7,454,430 B1 | | 11/2008 | Komissarchik et al. |
| 8,473,503 B2 | | 6/2013 | Cheng et al. |
| 8,799,624 B1 | | 8/2014 | Gehrke et al. |
| 9,183,286 B2 | | 11/2015 | Chen et al. |
| 9,384,264 B1 | | 7/2016 | Kavas |
| 9,613,109 B2 | | 4/2017 | Wright et al. |
| 9,615,555 B2 | | 4/2017 | Anwar et al. |

(Continued)

FOREIGN PATENT DOCUMENTS

| | | |
|---|---|---|
| EP | 3179387 A1 | 6/2017 |
| WO | 2006028953 A3 | 3/2006 |

(Continued)

OTHER PUBLICATIONS

Gilboa, Niv, "Two Party RSA Key Generation", In: Wiener, M. (eds) Advances in Cryptology—CRYPTO' 99. CRYPTO 1999. Lecture Notes in Computer Science, vol. 1666. Springer, Berlin (1999) (Year: 1999).*

(Continued)

*Primary Examiner* — Theodore C Parsons
(74) *Attorney, Agent, or Firm* — Baker & McKenzie LLP

(57) ABSTRACT

This disclosure is directed to generating a set of data elements for more secure encryption or more resilient decryption associated with generating a target set of conditional data elements. The target set of conditional data elements may fulfill a condition. Public keys associated with an encrypted message may be associated with conditional data elements of the target set of conditional data elements. By performing at least one cycle of decryption associated with the public keys, an encrypted message may be decrypted.

20 Claims, 7 Drawing Sheets

(56) References Cited

U.S. PATENT DOCUMENTS

| | | | |
|---|---|---|---|
| 9,922,066 | B2 | 3/2018 | Swan et al. |
| 10,394,555 | B1 | 8/2019 | Sinchev et al. |
| 10,860,317 | B2 | 12/2020 | Sinchev et al. |
| 2002/0186837 | A1* | 12/2002 | Hopkins ............... H04L 9/3033 380/28 |
| 2004/0044662 | A1 | 3/2004 | Ganesan et al. |
| 2004/0049503 | A1 | 3/2004 | Modha et al. |
| 2005/0190912 | A1* | 9/2005 | Hopkins ............... H04L 9/3033 380/44 |
| 2006/0047636 | A1 | 3/2006 | Mohania et al. |
| 2006/0047646 | A1 | 3/2006 | Maluf et al. |
| 2006/0074881 | A1 | 4/2006 | Vembu et al. |
| 2006/0173920 | A1 | 8/2006 | Adler et al. |
| 2006/0218123 | A1 | 9/2006 | Chowdhuri et al. |
| 2008/0077570 | A1 | 3/2008 | Tang et al. |
| 2009/0012923 | A1 | 1/2009 | Moses et al. |
| 2012/0330944 | A1 | 12/2012 | Vailaya et al. |
| 2014/0365545 | A1 | 12/2014 | Moffitt |
| 2016/0132572 | A1 | 5/2016 | Chang et al. |
| 2016/0283599 | A1 | 9/2016 | Zonabend |
| 2018/0349364 | A1 | 12/2018 | Arnold et al. |
| 2021/0226783 | A1* | 7/2021 | Levin ................... H04L 9/0866 |

FOREIGN PATENT DOCUMENTS

| | | |
|---|---|---|
| WO | 2007149623 A2 | 12/2007 |
| WO | 2009105708 A3 | 8/2009 |
| WO | 2015084757 A1 | 6/2015 |
| WO | 2020128606 A1 | 6/2020 |

OTHER PUBLICATIONS

Malkin, Michael, Thomas D. Wu, and Dan Boneh. "Experimenting with Shared Generation of RSA Keys." NDSS. (1999) (Year: 1999).*

C.A.R. Hoare, "Quicksort", The Computer Journal, vol. 5, Issue 1, Jan. 1, 1962, https://doi.org/10.1093/comjnl/5.1.10, 10-16 pages.

Richard Schroeppel, et al., "Algorithm for Certain NP-Complete Problems", Laboratory for Computer Science, Massachusetts Institute of Technology, Massachusetts, Jan. 1980, 27 pages.

S.G. Aki, "Adaptive and Optimal Parallel Algorithms for Enumerating Permutations and Combinations", Department of Computing and Information Service, Queen's University, Kingston, Ontario, Canada, The Computer Journal, vol. 30, No. 5, 1987, 4 pages.

International Search Report and Written Opinion dated May 14, 2020 in connection with International Application No. PCT/B2019/001297, 12 pages.

E. Horowitz, S. Sanni, Computing Partitions with Application to the Knapsack Problem // Journal of the ACM (JACM), 1974, T21, pp. 277-292.

Ervin Knuth, "The Art of Computer Programming", Third Edition, vol. 1, Fundamental Algorithims, May 1997, 664 pages.

Jeffrey J. McConnell, Analysis of Algorithms: An Active Learning Approach, Jonas and Bartlett Publishers, 2001, 315 pages.

Granino A. Korn et al., Mathematical Handbook for Scientists and Engineers, Dover Publications, 2000, 1151 pages.

Sinchev et al., Series of Geology and Technical Sciences, News of the Academy of Sciences of the Republic of Kazakhstan, May-Jun. 2019, 13 pages.

Sinchev, et al., Series of Geology and Technical Sciences, News of the Academy of Sciences of the Republic of Kazakhstan, Sep.-Oct. 2018, 14 pages.

Chermidov, Distribution of Prime and Composite Numbers and their Algorhythmic Appendices, Math-Net.Ru, 2017, https://doi.org/10.24143/2072-9502-2017-3-48-64, 18 pages.

Malakhovsky, On some regularities in the structure of prime numbers, 2014, issue 4, 4 pages.

Leonidovich, Ultra fast finding of all prime numbers: formula, Bulletin of Science and Practice, 2017, 6 pages.

Ribenboim. The College Mathematics Journal, vol. 25, No. 4, Sep. 1994, 13 pages.

Darling, Weird maths: At the edge of Infinity and beyond, Oneworld Publications, 2019, 288 pages, https://books.google.kz/books/about/Weird_Maths.html?id=m0KYswEACAAJ&redir_esc=y.

Crandall, Prime numbers: A computational Perspective, Springer Science & Business Media, Apr. 7, 2006, 597 pages, https//books.google.ru/books?id=8KZ4RQufxhYC.

Warren, Hacker's Delight; Chapter 18: Formulas for primes, Addison-Wesley, Sep. 25, 2012, 512 pages, https.//books.google.kz/books?id=VicPJYM0I5QC&hl=ru.

U.S. Appl. No. 10/860,317.

U.S. Appl. No. 10/394,555.

Sinchev et al., Polynomial Time Algorithms For Solving NP-Complete Problems,Series of Geology and Technical Sciences,vol. 3, No. 441, 2020, 5 pages.

Sinchev et al.,New methods of information search, News of the National Academy of Sciences of Kazakhstan, Series of Geology and Technical Sciences. vol. 3, No. 435, 2019, 5 pages.

* cited by examiner

CRYPTOGRAPHY KEY GENERATION METHOD FOR ENCRYPTION AND DECRYPTION

TECHNICAL FIELD

This disclosure is directed to computing network architectures for encryption and decryption associated with computing operations.

BACKGROUND

There is a need for more secure encryption and more resilient decryption in complex computing networks.

BRIEF SUMMARY

In some embodiments a method is provided for generating a set of data elements for more secure encryption or more resilient decryption, the method comprising:

generating, using one or more computing device processors, at least one set of data elements, wherein the at least one set of data elements comprises one or more data elements resulting from one or more computing operations, wherein a first data element of the one or more data elements of the at least one set of data elements is associated with a first index of the at least one set of data elements, wherein a computing operation input element of a first computing operation of the one or more computing operations is associated with the first index;

utilizing, using the one or more computing device processors, a physical or virtual memory for storing the at least one set of data elements;

performing, using the one or more computing device processors, at least one cycle of property determination, wherein the at least one cycle of property determination comprises:

selecting, using the one or more computing device processors, the first data element of the at least one set of data elements associated with index information of the at least one set of data elements;

decomposing, using the one or more computing device processors, the selected first data element of the at least one set of data elements into one or more first data components, associated with the first data element, based on the computing operation input element, wherein the one or more first data components are associated with the first index of the at least one set of data elements;

performing, using the one or more computing device processors, a condition-determining computing operation, wherein the condition-determining computing operation is associated with at least one property of prime numbers, wherein the condition-determining computing operation comprises determining whether the first data element is a prime number;

in response to determining the first data element of the at least one set of data elements and the one or more first data components associated with the selected first data element fulfill a condition associated with the at least one property of prime numbers:

adding, using the one or more computing device processors, the first data element of the at least one set of data elements to a target set of conditional data elements, wherein the target set of conditional data elements is associated with target index information, wherein the target index information is related to the index information of the at least one set of data elements;

utilizing, using the one or more computing device processors, the physical or virtual memory for storing the target set of conditional data elements, wherein the target set of conditional data elements used for encryption or decryption comprises conditionally selected data elements of the at least one set of data elements.

In some embodiments, the at least one cycle of property determination is performed for every data element of the at least one set of data elements.

In some embodiments, the method comprises receiving or determining, using the one or more computing device processors, an intermediate computing operation result, wherein the intermediate computing operation result is based on an intermediate computing operation associated with the first data element of the at least one set of data elements, wherein the intermediate computing operation result associated with the first data element of the at least one set of data elements is related to the first computing operation of the one or more computing operations, and wherein the intermediate computing operation result is associated with the first index of the at least one set of data elements, and wherein the intermediate computing operation result is associated with the computing operation input element.

In some embodiments, the condition is considered fulfilled when at least one of the following fails:

the selected first data element of the at least one set of data elements comprises a difference between a square of a first data component and a square of a second data component, and added a third data component, or a difference between the third data component and a square of the second data component equals a product of the first data component and the fourth data component, wherein the first data component is greater than the second data component, wherein the third data component is equal to or greater than the square of the second data component, and wherein at least one of the first data component, the second data component, the third data component, or the fourth data component are natural numbers, wherein natural numbers comprise zero.

In some embodiments, the data elements of the at least one set of data elements are derived by a sum of: a product and a fixed component, wherein the product comprises a pre-determined integer number and the computing operation input element, wherein the fixed component is either a positive integer or a negative integer, and wherein the computing operation input element is a variable integer number.

In some embodiments, the at least one set of data elements comprises prime numbers and composite numbers, wherein the at least one set of data elements is mapped to a floating point number set using a logarithmic based computing operation, or wherein the at least one set of data elements comprises data elements in one of a decimal system, a binary system, or a hexadecimal system.

In some embodiments, the method comprises receiving or accessing, using the one or more computing device processors, a first public key associated with a product of a first conditional data element of the target set of conditional data elements and a second conditional data element of the target set of conditional data elements;

receiving or accessing, using the one or more computing device processors, a second public key associated with a third conditional data element of the target set of conditional data elements;

receiving or accessing, using the one or more computing device processors, an encrypted message;

performing, using the one or more computing device processors, at least one cycle of decryption, the at least one cycle of decryption comprising:

selecting, using the one or more computing device processors, a second computing operation input element, wherein the second computing operation input element is a natural number;

performing, using the one or more computing device processors, a second condition-determining computing operation, wherein the second condition-determining computing operation comprises determining whether a computing operation result is an integer;

in response to determining the computing operation result is an integer:

determining, using the one or more computing device processors, a decrypted message associated with the encrypted message, wherein the computing operation result is the decrypted message.

In some embodiments, the method comprises performing, using the one or more computing device processors, the at least one cycle of property determination two or more times;

receiving or accessing, using the one or more computing device processors, a public key, wherein the public key is a product of at least two secret keys;

determining or generating, using the one or more computing device processors, a mapped public key, wherein the mapped public key is based on a sum of at least two mapped data elements associated with the at least two secret keys;

receiving or accessing, using the one or more computing device processors, the target set of conditional data elements, wherein the target set of conditional data elements comprises two or more conditional data elements, wherein a first conditional data element of the two or more conditional data elements is associated with a first target index of the target set, and wherein a second conditional data element of the two or more conditional data elements is associated with a second target index of the target set;

determining or generating, using the one or more computing device processors, a second target set of mapped data elements mapped using one or more indexes to the target set of conditional data elements, wherein the second target set of mapped data elements comprises two or more mapped data elements, wherein a first mapped data element of the two or more mapped data elements is associated with a first mapped index of the second target set, and wherein a second mapped data element of the two or more mapped data elements is associated with a second mapped index of the second target set;

utilizing the physical or virtual memory for storing the second target set;

determining, using the one or more computing device processors, equivalence between a sum of at least two mapped data elements of the second target set of mapped data elements and the mapped public key;

determining, using the one or more computing device processors, mapped index information associated with the at least two mapped data elements of the second target set of mapped data elements;

determining, using the one or more computing device processors, and based on the mapped index information associated with the at least two mapped data elements of the second target set of mapped data elements, related target index information associated with at least two conditional data elements of the target set of conditional data elements;

determining, using the one or more computing device processors, and using the related target index information associated with the at least two conditional data elements of the target set of conditional data elements, the at least two conditional data elements of the target set of conditional data elements, wherein the at least two secret keys are determined by the at least two conditional data elements of the target set of conditional data elements, and wherein the product involving the at least two secret keys determined by the at least two conditional data elements of the target set of conditional data elements results in the public key; and deleting the second target set of mapped data elements from the physical or virtual memory, or overwriting, in the physical or virtual memory, the second target set of mapped data elements with data.

In some embodiments, the method comprises receiving or accessing an encrypted message;

decrypting, using the at least two secret keys, the encrypted message.

In some embodiments, the mapped public key is mapped to a floating point number using a logarithmic based computing operation.

In some embodiments, a method is provided for generating a set of data elements for more secure encryption or more resilient decryption, the method comprising:

generating, using one or more computing device processors, at least one set of data elements, wherein the at least one set of data elements comprises one or more data elements resulting from one or more computing operations, wherein a first data element of the one or more data elements of the at least one set of data elements is associated with a first index of the at least one set of data elements, wherein a computing operation input element of a first computing operation of the one or more computing operations is associated with the first index;

utilizing, using the one or more computing device processors, a physical or virtual memory for storing the at least one set of data elements;

performing, using the one or more computing device processors, at least one cycle of property determination, wherein the at least one cycle of property determination comprises:

selecting, using the one or more computing device processors, the first data element of the at least one set of data elements associated with index information of the at least one set of data elements;

decomposing, using the one or more computing device processors, the selected first data element of the at least one set of data elements into one or more first data components, associated with the first data element, based on the computing operation input element, wherein the one or more first data components are associated with the first index of the at least one set of data elements;

performing, using the one or more computing device processors, a condition-determining computing operation, wherein the condition-determining computing operation is associated with at least one property of prime numbers;

in response to determining the first data element of the at least one set of data elements and the one or more first data components associated with the selected first data element do not fulfill a condition associated with the at least one property of prime numbers:

adding, using the one or more computing device processors, the first data element of the at least one set of data elements to a target set of conditional data elements, wherein the target set of conditional data elements is associated with target index information, wherein the target index information is related to the index information of the at least one set of data elements;

utilizing, using the one or more computing device processors, the physical or virtual memory for storing the target set of conditional data elements, wherein the target set of conditional data elements is a complete set of data elements for encryption or decryption comprising conditionally selected data elements of the at least one set of data elements.

In some embodiments, the condition is considered fulfilled when at least one of the following is fulfilled:

the selected first data element of the at least one set of data elements comprises a difference between a square of a first data component and a square of a second data component, and added a third data component, or a difference between the third data component and a square of the second data component equals a product of the first data component and the fourth data component, wherein the first data component is greater than the second data component, wherein the third data component is equal to or greater than the square of the second data component, and wherein the first data component, the second data component, the third data component, and the fourth data component are natural numbers, wherein natural numbers comprise zero.

In some embodiments, the target set of conditional data elements comprises at least one of integer numbers, odd numbers, prime numbers, natural numbers, or real numbers.

In some embodiments, the determining equivalence between a sum of the at least two mapped data elements of the second target set of mapped data elements and the mapped public key comprises executing a data element selection operation based on a target computing operation result.

Figure 1:
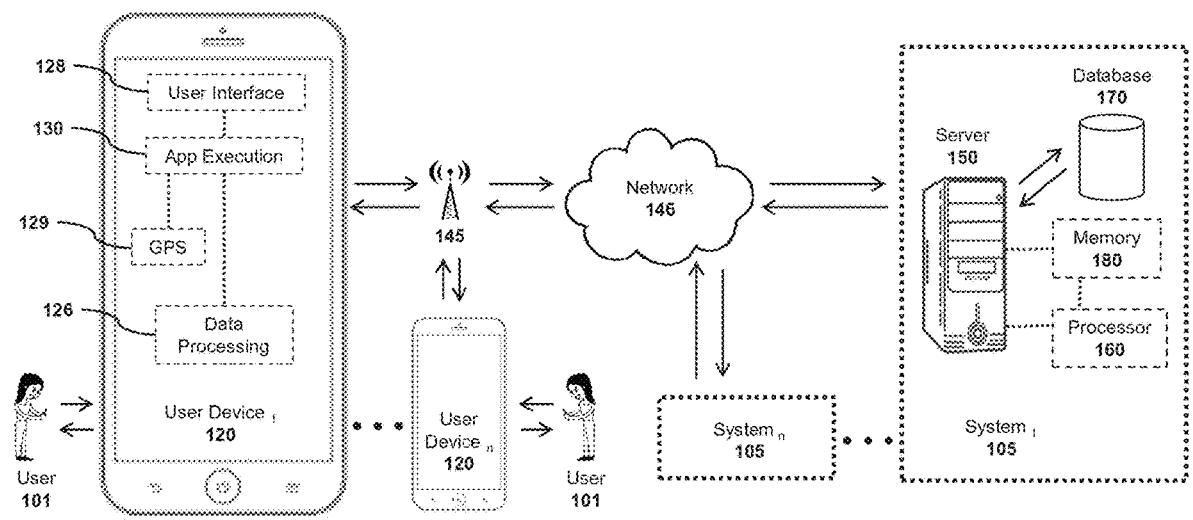
FIG. 1 is a network diagram for executing any methods described herein, in accordance with some embodiments of the disclosure.

All of these drawings are illustrations of certain embodiments. The scope of the claims is not limited to the specific embodiments illustrated in the drawings and described herein.

DETAILED DESCRIPTION OF THE EMBODIMENTS

In some embodiments, any computing device, system, or apparatus described herein may be a mobile or non-mobile computing device, a mobile phone, laptop, tablet, watch, e-reader, headgear, eyewear, a front-end or back-end server, etc. Any computing device may have voice and data capabilities. In some embodiments, the term "data" may refer to "signal" or "information." In some embodiments, the terms "signal," "data," and "information" may be used interchangeably. Any reference to data may also include references to the contents of the data. Any signals described herein may be electronic or electromagnetic signals. Additionally, any signals described herein may be either be transitory or non-transitory signals. Additionally, any signals described herein may be analog signals, digital signals, and/or mixed analog and digital signals. The terms "system," "apparatus," "server," "box," "agent," "device," "unit," "sub-unit," "element," "application," "infrastructure," etc., may be used interchangeably in some embodiments. In some embodiments, any data or data set described herein may be structured or unstructured. In some embodiments, a method is provided for performing the various steps performed by any system described herein. In some embodiments, a non-transitory computer-readable medium comprising code is provided for causing a system to perform the various methods described herein. In some embodiments, a system may comprise a housing that includes various units, such as those illustrated in FIGS. 1 and 2. In some embodiments, a chipset may be disposed in the housing and may be interfaced with a processor. The chipset may have hardware (e.g., electronic components in an electronic circuit) for supporting various connections within the system, or any other connection from the system to external systems.

This disclosure is directed to generating a set of data elements for more secure encryption or more resilient decryption associated with generating a target set of conditional data elements. This disclosure is further directed to determining keys for faster decryption associated with mapping a public key, mapping a target set of conditional data elements, and determining at least two secret keys associated with the public key. This disclosure is further directed to faster decryption of an encrypted message associated with two public keys.

FIG. 1 describes a schematic block diagram of a network system for reducing time and memory usage associated with computing operations. While the user device 120 is shown as a mobile phone, in other embodiments, the user device 120 may be any other mobile or non-mobile computing device, including Internet of Things (IoT) devices. The illustrated network 146, such as the internet or an intranet, can be used to exchange data between the server 150 and the user device 120.

According to some embodiments, a user 101 and/or another computer interacts with the disclosed systems for determining a subset from a set according to the methods disclosed herein. Disclosed user devices 120 may include computing device capable of sending data and communicating over the internet with one or more servers 150, other user devices 120, or other type of computing devices. The methods described herein may be executed by at least one of the user device 120 (e.g., using the app execution 130 and data processing 126 systems), the server 150 (e.g., using the processor 160), or a combination of both.

A wireless communications network 145 may be a 3G network, 4G, LTE, 5G, Wi-Fi, Bluetooth, or any other network protocol and may be a combination of any number of networks. Further, as mentioned above a wired network connection such as a conventional Ethernet connection could be used, such as with a personal computer with an Ethernet port. User devices 120 or servers 150 may include processors 430 such as digital signal processors or a microprocessors for performing the different methods described in this specification.

Although the servers 150 illustrated in the present figure are illustrated as stand-alone computing machines, the computing functionality, including servers 150, processors or processor instances 160, memory or computing data storage areas 180, and databases 170 can be provided through a cloud implementation such as Amazon Web Services or by a hybrid enterprise/cloud architecture. It is understood that the terms system, apparatus, device, etc. may be used interchangeably in this specification. In some embodiments, a method is provided for performing the various steps performed by any computing device, e.g. user device 120 and/or server 150, described herein. In some embodiments, a non-transitory computer-readable medium comprising code is provided for causing any user device 120, computing device, or server 150, to perform the various methods described herein. The scope of any claims that may be a part of this application or any application stemming from the present application shall be determined by those claims as read in light of the claims, but the elements of the particularly illustrated embodiments shall not be imputed to the claim language unless particularly invoked through the use of means-plus-function language under 35 U.S.C. Section 112(f).

Figure 2:
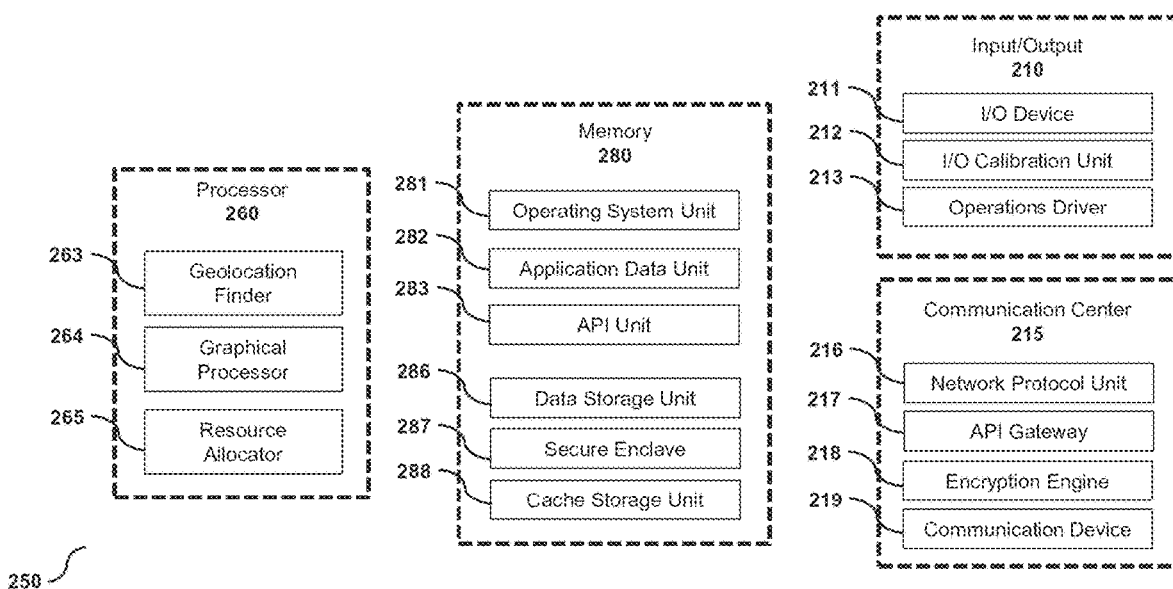
FIG. 2 is a system diagram for executing any methods described herein, in accordance with some embodiments of the disclosure.

FIG. 2 illustrates an exemplary complex computing environment, in accordance with some embodiments of the disclosure. For example, the computing environment may be included in and/or utilized by the system, the user device, and/or any other system described herein. The computing environment and/or any of its units and/or sub-units described herein may include general hardware, specifically-purposed hardware, and/or specially purposed-software.

The computing environment may include, among other units, a processor 260, a memory 280, an input/output (I/O) unit 210, and a communication center 215. As described herein, each of the processor, the memory, the I/O unit, and/or the communication unit may include and/or refer to a plurality of respective units, sub-units, and/or elements. The various units may be implemented entirely in hardware, entirely in software, or in a combination of hardware and software. Some of the units may be optional. Any software described herein may be specially purposed software for performing a particular function. In some embodiments, hardware may also be specially purposed hardware for performing some particular functions. Furthermore, each of the processor, the memory unit, the I/O unit, the communication unit, and/or the other units in FIG. 2, may be operatively and/or otherwise communicatively coupled with each other using a chipset such as an intelligent chipset. The chipset may have hardware for supporting connections in the computing environment and connections made to external systems from the computing environment. While various units of FIG. 2 are presented as separate units, some of the units may be comprised in other units. Additionally, some of the units may be optional. Additionally, one or more units may be coupled or connected (e.g., via a wired or wireless connection) to other units. For example, the processor may be connected to one or more other units in FIG. 2.

As illustrated in FIG. 2, a server 250 (which may be the system 105 or may be comprised in the system 105) may include, among other elements, any combination of a processor 260, a memory 280, an input/output (I/O) 210, and a communication center 215. As described in present embodiments, each of the processor 260, the memory 280, the I/O 210, and communication center 215 may include a plurality of respective units, subunits, and/or elements. Furthermore, each of the processor 260, the memory 280, the I/O 210, and the communication center 215 may be operatively or otherwise communicatively coupled with each other so as to facilitate the methods and techniques described herein.

The processor 260 may control any one or more of the memory 280, the I/O 210, the communication center 215, or any other unit which may include the server 250, as well as any included subunits, elements, components, devices, or functions performed by each or a combination of the memory 280, the I/O 210, the communication center 215 or any other unit which may include the server 250. Any of the elements or sub-elements of the server 250 presented here may also be included in a similar fashion in any of the other units, subunits, and devices included in the operating system of FIG. 1. Additionally, any actions described herein as being performed by a processor 260 may be taken by the processor 260 alone, or by the processor 260 in conjunction with one or more additional processors, units, subunits, elements, components, devices, and the like. Additionally, while only one processor 260 may be shown in the figures included here, multiple processors may be present or otherwise included in the server 250 or elsewhere in the operating system of FIG. 1. Thus, while instructions may be described as being executed by the processor 260 or the various subunits 263, 264, 265 of the processor, the instructions may be executed simultaneously, serially, or otherwise by one or more multiple processors 260.

In some embodiments, a processor 260 may be implemented as one or more computer processor (CPU) chips, graphical processor (GPU) chips, or some combination of CPU chips and GPU chips, and may include a hardware device capable of executing computer instructions. The processor 260 may execute any combination of instructions, codes, computer programs, and scripts. The instructions, codes, computer programs, and scripts may be received from, stored in, or received from and stored in any combination of the memory 280, the I/O 210, the communication center 215, subunits of the previously described elements, other devices, other computing environments. In some embodiments, various portions of any of the methods described herein may be executed either in series or in parallel.

In some embodiments, the processor 260 may include, among other elements, subunits. Subunits may include any combination of a geolocation finder 263, a graphical processing unit 264, and a resource allocator 265. Each of these subunits of the processor 260 may be communicatively or otherwise operably coupled with each other. Any of the subunits described with respect to any units or systems may be optionally included those units or systems.

The geolocation finder 263, particularly in communication with geolocation information provided by GPS subsystems 129 of user devices 120 (see FIG. 1) may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 263 may include any one or a combination of various sensors, specifically-purposed hardware elements for enabling the geolocation finder 263 to acquire, measure, and transform location information.

The graphical processor (GPU) 264 may facilitate any combination of generation, modification, analysis, processing, transmission, and presentation of visual content. In some embodiments, the GPU 264 may be configured to receive multiple images from a user and perform analysis on and/or modifications to the images. Further, the GPU 264 may be configured to facilitate adjustments to videos and images associated with a user. The GPU 264 may also be configured to render visual content for presentation on a user device 120 and/or to analyze visual content for metadata associated with a user or a user device. The GPU 264 may include multiple GPUs and may therefore be configured to perform and/or execute multiple processes in parallel.

The resource allocator 265 may facilitate any one or combination of the determination, monitoring, analysis, and allocation of resources throughout the server 150, the system 105, any component of the system of FIG. 1, or other computing environments. For example, the resource allocator 265 may facilitate interaction between the server 250, any subunit of the server 250, and a high volume (e.g. multiple) of users or associated user devices 120. As such, computing resources of the server 250 utilized by any one or a combination of the processor 260, the memory 280, the I/O device/IO unit 210, the communication center 215, and any subunit of these units, such as processing power, data storage space, network bandwidth, and the like may be in high demand at various times during operation. Accordingly, the resource allocator 265 may be configured to manage the allocation of various computing resources as they are required by particular units or particular subunits of the server 250.

In some embodiments, the resource allocator 265 may include sensors and/or other specially-purposed hardware for monitoring performance of each unit and/or subunit of the server 250, as well as hardware for responding to the computing resource needs of each unit or subunit. In some embodiments, the resource allocator 265 may utilize computing resources of a second computing environment separate and distinct from the server 250 to facilitate a desired operation.

In some embodiments, factors affecting the allocation of computing resources by the resource allocator 265 may include the number of ongoing user device connections and/or other communication channel connections, a duration during which computing resources are required by one or more elements of the server 250, and/or the like. In some embodiments, computing resources may be allocated to and/or distributed amongst a plurality of second computing environments included in the server 250 based on one or more factors mentioned above. In some embodiments, the allocation of computing resources of the resource allocator 265 may include one or more resource allocators 265 flipping a switch, adjusting processing power, adjusting memory size, partitioning a memory element, transmitting data, controlling one or more input and/or output devices, modifying various communication protocols, and the like. In some embodiments, the resource allocator 265 may facilitate utilization of parallel processing techniques such as dedicating a plurality of GPUs included in the processor 260 for processing high-quality analysis and manipulation of images and/or videos.

In some embodiments, the memory 280 may be utilized for one or any combination of storing, recalling, receiving, transmitting, and/or accessing various files and/or information during operation of the server 250. For example, the memory 280 may be utilized for storing recalling, and/or updating any datasets described herein. The memory 280 may include various types of data storage media such as solid state storage media, hard disk storage media, and any other type of data storage medium which may be known to a person of ordinary skill in the art. The memory 280 may include dedicated hardware elements such as hard drives and/or servers, as well as software elements such as cloud-based storage drives. For example, the memory unit 280 may include various subunits such as an operating system unit 281, an application data unit 282, an application programming interface (API) unit 283, a data storage unit 286, a secure enclave 287, and/or a cache storage unit 288.

The memory 280 and any of its subunits described here may include any one or any combination of random access memory (RAM), read only memory (ROM), and various forms of secondary storage. RAM may be used to store volatile data and/or to store instructions that may be executed by the processor 260. For example, the data stored may be any one or a combination of a command, a current operating state of the server 250, an intended operating state of the server 250, and the like. As a further example, data stored in the memory 280 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 280 may include one or more databases for storing any data described here, e.g. the database 170 of FIG. 1. Additionally or alternatively, one or more secondary databases located remotely from the server 250 may be utilized and/or accessed by the memory 280.

The operating system unit 281 may facilitate deployment, storage, access, execution, and/or utilization of an operating system utilized by the server 250 and/or any other computing environment described herein. In some embodiments, the operating system may include various hardware and/or software elements that serve as a structural framework for enabling the processor 260 to execute various operations such as the analysis of data received from user devices 120, etc. The operating system unit 281 may further store various pieces of information and/or data associated with operation of the operating system and/or the server 250 as a whole, such as a status of computing resources (e.g., processing power, memory availability, resource utilization, and/or the like), runtime information, modules to direct execution of operations described herein, user permissions, security credentials, and the like.

The application data unit 282 may facilitate deployment, storage, access, execution, and/or utilization of an application utilized by the server 250 or any other computing environment described herein (e.g., a user device 120). For example, users may be required to download, access, and/or otherwise utilize a software application on a user device 120 such as a smartphone or other internet-enabled device in order for various operations described herein to be performed. As such, the application data unit 282 may store any information and/or data associated with the application which may allow the application and/or user device 220 to perform methods described herein. As such, information included in the application data unit 282 may enable a user to execute various operations described here. The application data unit 282 may further store various pieces of information and/or data associated with operation of the application and/or the server 250 as a whole, such as a status of computing resources (e.g., processing power, memory availability, resource utilization, and/or the like), runtime information, modules to direct execution of operations described herein, user permissions, security credentials, and the like.

The application programming interface (API) unit 283 may facilitate deployment, storage, access, execution, and/or utilization of information associated with APIs of the server 250 and/or any other computing environment described herein (e.g., a user device). For example, server 250 may include one or more APIs for enabling various devices, applications, and/or computing environments to communicate with the server 250, multiple other servers, databases, or other user devices. Accordingly, the API unit 283 may include API databases containing information that may be accessed and/or utilized by applications and/or operating systems of other devices and/or computing environments associated with the methods described herein. An API may direct communications between the background component of the user device 120 and the server 250. In some embodiments, each API database may be associated with a customized physical circuit included in the memory unit 280 and/or the API unit 283. Additionally, each API database may be public and/or private, and so authentication credentials may be required to access information in an API database.

The data storage unit 286 may facilitate one or more of deployment, storage, access, analysis, and utilization of data content by the server 250 and any other computing environment described herein (e.g., a user device). Data content may be text, numbers, images, videos, audio files, and any other form of media. For example, the data storage unit 286 may store one or more images which may be uploaded from a user device. Further, the data storage unit 286 may store one or more images which have been manipulated by any unit or subunit of a server 250 or user device. In some embodiments, the data storage unit 286 may communicate with the GPUs 264 to facilitate any of the processes described here.

The secure enclave 287 may facilitate secure storage of data. In some embodiments, the secure enclave 287 may include a partitioned portion of storage media included in the memory unit 280 that is protected by various security measures. For example, the secure enclave 287 may be hardware secured. In other embodiments, the secure enclave 287 may include one or more firewalls, encryption mechanisms, and/or other security-based protocols. Authentication credentials of a user may be required prior to providing the user access to data stored within the secure enclave 287. In some embodiments, the secure enclave 287 may store sensitive user information.

The cache storage unit 288 may facilitate short-term deployment, storage, access, analysis, and/or utilization of data. In some embodiments, the cache storage unit 288 may serve as a short-term storage location for data so that the data stored in the cache storage unit 288 may be accessed quickly. In some embodiments, the cache storage unit 288 may include RAM and/or other storage media types that enable quick recall of stored data. The cache storage unit 288 may include a partitioned portion of storage media included in the memory 280. In some embodiments, the cache storage unit 288 may store any data described herein.

The I/O unit 210 may include hardware and/or software elements for enabling the server 250 to receive, transmit, and/or present information. For example, elements of the I/O unit 250 may be used to receive user input from a user via a user device 220, and the like. In this manner, the I/O unit 210 may enable the server 250 to interface with a human user in a manner such that the user may use the methods described here. As described, the I/O unit 210 may include subunits such as any one or a combination of an I/O device 211, an I/O calibration unit 212, and/or operations driver 213.

The I/O device 210 may facilitate any one or any combination of the receipt, transmission, processing, presentation, display, input, and output of information as a result of executed processes described here. In some embodiments, the I/O device 210 may include a plurality of I/O devices. In some embodiments, the I/O device 210 may include one or more elements of any one or a combination of a user device 120, a server 250, and/or a similar device(s).

The I/O device 211 may include a variety of elements that enable a user to interface with the server 250. For example, the I/O device 211 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 211 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 211 may communicate with one or more elements of the processor 260 and/or the memory unit 280 to execute operations described herein. For example, the I/O device 211 may include a display, which may utilize the GPU 264 to present media content stored in the data storage unit 286 to a user of a user device 120.

The I/O calibration unit 212 may facilitate the calibration of the I/O device 211. For example, the I/O calibration unit 212 may detect and/or determine one or more settings of the I/O device 211, and then adjust and/or modify settings so that the I/O device 211 may operate more efficiently. In some embodiments, the I/O calibration unit 212 may utilize an operations driver 213 (or multiple operations drivers) to calibrate the I/O device 211. The operations driver 213 may alternatively be installed on a user device 120 so that the user device 120 may recognize and/or integrate with the I/O device 211, thereby enabling media content to be displayed, received, generated, and the like. In some embodiments, the I/O device 211 may be calibrated by the I/O calibration unit 212 by based on information included in the operations driver 213.

The communication center 215 may facilitate establishment, maintenance, monitoring, and/or termination of communications between the server 250 and other devices such as user devices 120, other computing environments, third party server systems, and the like. The communication center 215 may further enable communication between various elements (e.g., units and/or subunits) of the server 250 as needed to perform the methods described herein. In some embodiments, the communication center 215 may include a network protocol unit 216, an API gateway 217, an encryption engine 218, and/or a communication device 219. The communication center 215 may include hardware and/or software elements.

The network protocol unit 216 may facilitate establishment, maintenance, and/or termination of a communication connection between the server 250 and another device (e.g. user device 120) by way of a network. For example, the network protocol unit 216 may detect and/or define a communication protocol required by a particular network and/or network type. Communication protocols utilized by the network protocol unit 216 may include Wi-Fi protocols, Li-Fi protocols, cellular data network protocols, Bluetooth® protocols, WiMAX protocols, Ethernet protocols, powerline communication (PLC) protocols, and the like. In some embodiments, facilitation of communication between the server 250 and any other device, as well as any element internal to the server 250, may include transforming and/or translating data from being compatible with a first communication protocol to being compatible with a second communication protocol. In some embodiments, the network protocol unit 216 may determine and/or monitor an amount of data traffic to consequently determine which particular network protocol is to be used for establishing a connection with a user device, transmitting data, and/or performing other operations described herein.

The API gateway 217 may facilitate the enablement of other devices and/or computing environments to access the API unit 283 of the memory 280 of the server 250. For example, a user device 120 may access the API unit 283 via the API gateway 217. In some embodiments, the API gateway 217 may be required to validate user credentials (e.g. login ID 225, password 226 of FIG. 2) associated with a user of a user device 120 prior to providing access to the API unit 283 to the user. The API gateway 217 may include instructions for enabling the server 250 to communicate with another device.

The encryption engine 218 may facilitate any one or any combination of translation, encryption, encoding, decryption, and decoding of information received, transmitted, and/or stored by the server 250. For example, the encryption engine 218 may encrypt data. Using the encryption engine, each transmission of data may be encrypted, encoded, and/or translated for security reasons, and any received data may be encrypted, encoded, and/or translated prior to its processing and/or storage. In some embodiments, the encryption engine 218 may generate any one or combination of an encryption key, an encoding key, a translation key, and the like, which may be transmitted along with any data content.

The communication device 219 may include a variety of hardware and/or software specifically purposed to enable communication between the server 250 and another device (e.g. user device 120), as well as communication between elements of the server 250. In some embodiments, the communication device 219 may include one or more radio transceivers, chips, analog front end (AFE) units, antennas, processors, memory, other logic, and/or other components to implement communication protocols (wired or wireless) and related functionality for facilitating communication between the server 250 and any other device. Additionally and/or alternatively, the communication device 219 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

In some embodiments, implementation of any unit of any system described herein is contemplated in discrete components or fully integrated circuits in silicon, gallium arsenide, or other electronic materials families, as well as in other technology-based forms and embodiments. It should be understood that various embodiments of the disclosure can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The present disclosure, a new computing operation for generating a set of prime numbers for more secure encryption and more resilient decryption will significantly improve security and performance of all methods, computer software products, and computer systems used in the practical application of various cryptosystems relying on prime numbers.

The present disclosure demonstrates how a factorization problem may be simplified to a subset sum problem.

The present disclosure may generate a single prime number as well as a library of prime numbers. Various internet security systems, such as crypto-security and other encryption and decryption services, rely on the use of prime numbers or a library of prime numbers.

A set of data elements may comprise prime numbers and composite numbers, in some embodiments. In other embodiments, the set may comprise any particular types of numbers (e.g., just prime numbers, integers, etc.).

A prime number may be represented as the difference of two squared numbers in a unique way. If there is more than one way, it is a composite number. A composite number can be decomposed into a difference of two squares using Fermat's theorem.

The present disclosure provides a method for tougher decryption by using our own generated prime numbers. If a list of open source prime numbers is used for encryption (RSA standard) it is easy to decrypt in comparison to using our own generated prime numbers and methods presented herein.

The present disclosure provides a method for more secure encryption using a target set of new prime numbers. The target set of new prime numbers may be used in encryption processes, such as RSA or DSA standards.

Properties of a prime number:

A prime number is a natural number greater than 1.

A prime number has exactly two factors, 1 and the number itself.

The present disclosure provides a method for faster decryption using a set of prime numbers.

A first public key may be a product of at least two prime numbers from a set of prime numbers.

A second public key may be a prime number from a set of prime numbers.

If the first public key, the second public key, and an encrypted message are known, the encrypted message being associated with the first public key and the second public key, then the encrypted message can be decrypted.

Decrypt an encrypted message by taking the nth root of a sum of: a product and the encrypted message, wherein the product comprises a computing operation input element and the first public key, wherein the computing operation input element is a variable natural number, and wherein n is associated with the second public key.

If the nth root of a sum of: a product and the encrypted message, wherein the product comprises a computing operation input element and the first public key, wherein the computing operation input element is a variable natural number, and wherein n is associated with the second public key, is determined to be an integer number—then said integer number is associated with the decrypted message.

Figure 3:
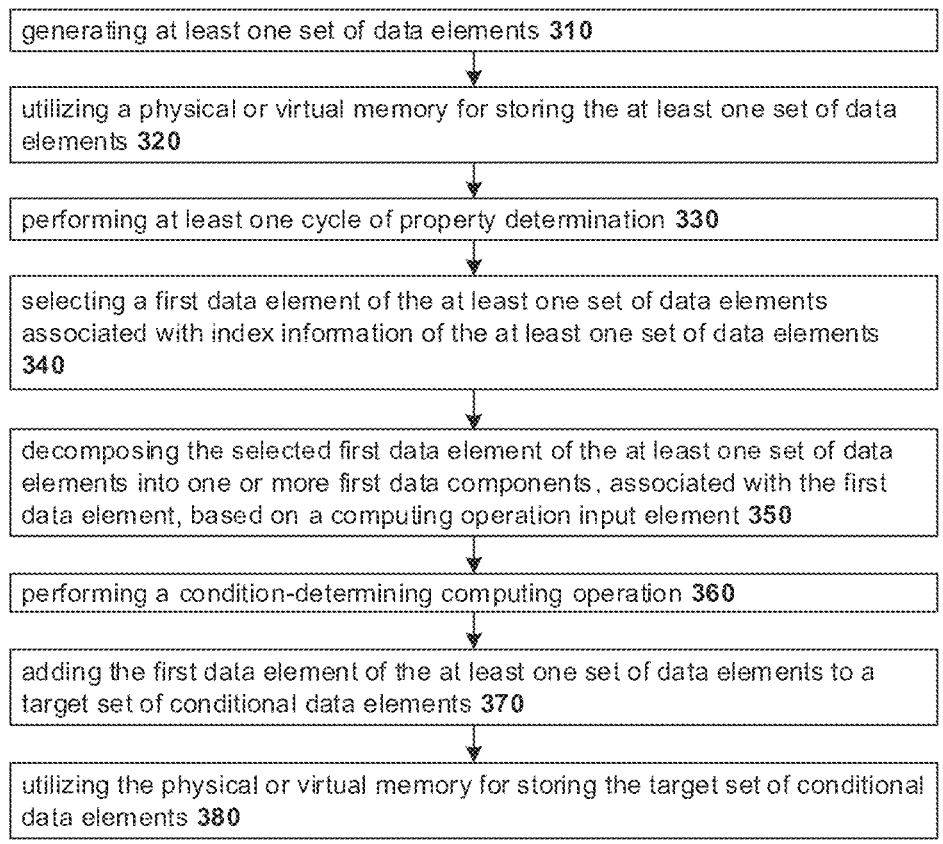
FIG. 3 is a method diagram for generating a set of data elements for more secure encryption and more resilient decryption, in accordance with some embodiments of the disclosure.

FIG. 3 describes an exemplary method for generating a set of data elements for more secure encryption and more resilient decryption according to some embodiments of the disclosure. Any of the methods described herein may be executed in any order. One or more of the method steps may be optional. The method comprises generating at least one set of data elements 310; utilizing a physical or virtual memory for storing the at least one set of data elements 320; performing at least one cycle of property determination 330; selecting a first data element of the at least one set of data elements associated with index information of the at least one set of data elements 340; decomposing the selected first data element of the at least one set of data elements into one or more first data components, associated with the first data element, based on a computing operation input element 350; performing a condition-determining computing operation 360; adding the first data element of the at least one set of data elements to a target set of conditional data elements 370; utilizing the physical or virtual memory for storing the target set of conditional data elements 380.

In some embodiments, at least one set of data elements may comprise one or more data elements resulting from one or more computing operations.

A first data element of one or more data elements of at least one set of data elements may be associated with a first index of the at least one set of data elements.

A computing operation input element of a first computing operation of one or more computing operations may be associated with a first index.

One or more first data components may be associated with a first index of at least one set of data elements.

A condition-determining computing operation may be associated with at least one property of prime numbers.

A condition-determining computing operation may comprise determining whether a first data element is a prime number.

A target set of conditional data elements may be associated with target index information.

Target index information may be related to index information of at least one set of data elements.

A target set of conditional data elements used for encryption or decryption may comprise conditionally selected data elements of at least one set of data elements.

In some embodiments, at least one cycle of property determination may be performed for every data element of at least one set of data elements.

In some embodiments, the method may further comprise receiving or determining an intermediate computing operation result, wherein the intermediate computing operation result may be based on an intermediate computing operation associated with a first data element of at least one set of data elements, wherein the intermediate computing operation result may be associated with the first data element of the at least one set of data elements, and wherein the intermediate computing operation result may be associated with a computing operation input element.

In some embodiments, a condition-determining computing operation may be associated with at least one property of prime numbers.

In response to determining a first data element of at least one set of data elements and one or more first data components associated with the first data element do not fulfill a condition associated with the at least one property of prime numbers, add the first data element of the at least one set of data elements to a target set of conditional data elements.

A condition may be considered not fulfilled when a selected first data element and one or more first data components associated with the first data element do not fulfill the Diophantine equations.

A condition may be considered fulfilled when at least one of the following fails: A selected first data element of at least one set of data elements may comprise a difference between a square of a first data component and a square of a second data component, and added a third data component; or a difference between the third data component and a square of the second data component may equal a product of the first data component and the fourth data component; wherein the first data component is greater than the second data component, wherein the third data component is equal to or greater than the square of the second data component, and wherein the at least one of the first data component, the second data component, the third data component, or the fourth data component are natural numbers, wherein natural numbers comprise zero.

In response to determining a first data element of at least one set of data elements and one or more first data components associated with the first data element fulfill a condition associated with the at least one property of prime numbers, add the first data element of the at least one set of data elements to a target set of conditional data elements.

A condition may be considered fulfilled when a selected first data element and one or more first data components associated with the first data element do not fulfill the Diophantine equations.

A condition is considered fulfilled when at least one of the following fails: A selected first data element of at least one set of data elements may comprise a difference between a square of a first data component and a square of a second data component, and added a third data component; or a difference between the third data component and a square of the second data component may equal a product of the first data component and the fourth data component; wherein the first data component is greater than the second data component, wherein the third data component is equal to or greater than the square of the second data component, and wherein the at least one of the first data component, the second data component, the third data component, or the fourth data component are natural numbers, wherein natural numbers comprise zero.

In some embodiments, data elements of at least one set of data elements may be derived by a sum of: a product and a fixed component, wherein the product comprises a predetermined integer number and a computing operation input element, wherein the fixed component is either a positive integer or a negative integer, and wherein the computing operation input element is a variable integer number.

In some embodiments, a generated target set of conditional data elements for encryption or decryption may be a library of prime numbers.

In some embodiments, a target set of conditional data elements may comprise every prime number within a given range.

In some embodiments, at least one set of data elements may comprise prime numbers and composite numbers.

At least one set of data elements may be mapped to a floating point number set using a logarithmic based computing operation.

At least one set of data elements may comprise data elements in one of a decimal system, a binary system, or a hexadecimal system.

In some embodiments, data elements of at least one set of data elements may comprise numbers not divisible by 2 or by 3.

Figure 4:
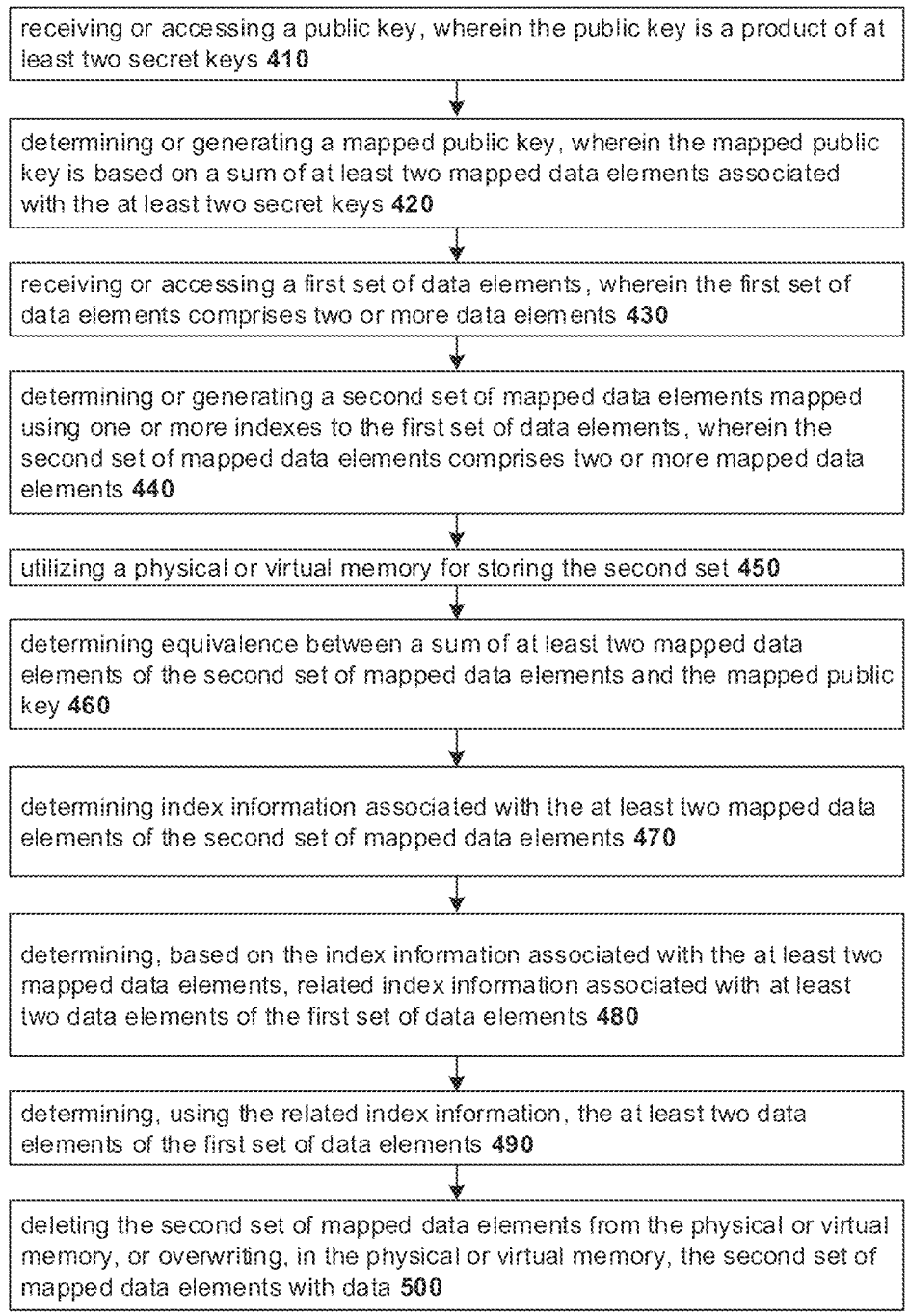
FIG. 4 is a method diagram for faster determination of keys for decryption, in accordance with some embodiments of the disclosure.

FIG. 4 describes an exemplary method for determining of keys for faster decryption according to some embodiments of the disclosure. Any of the methods described herein may be executed in any order. One or more of the method steps may be optional. The method comprises receiving or accessing a public key, wherein the public key is a product of at least two secret keys 410; determining or generating a mapped public key, wherein the mapped public key is based on a sum of at least two mapped data elements associated with the at least two secret keys 420; receiving or accessing a first set of data elements, wherein the first set of data elements comprises two or more data elements 430; determining or generating a second set of mapped data elements mapped using one or more indexes to the first set of data elements, wherein the second set of mapped data elements comprises two or more mapped data elements 440; utilizing a physical or virtual memory for storing the second set 450; determining equivalence between a sum of at least two mapped data elements of the second set of mapped data elements and the mapped public key 460; determining index information associated with the at least two mapped data elements of the second set of mapped data elements 470; determining, based on the index information associated with the at least two mapped data elements, related index information associated with at least two data elements of the first set of data elements 480; determining, using the related index information, the at least two data elements of the first set of data elements 490; deleting the second set of mapped data elements from the physical or virtual memory, or overwriting, in the physical or virtual memory, the second set of mapped data elements with data 500.

In some embodiments, a first data element of two or more data elements may be associated with a first index of a first set.

A second data element of two or more data elements may be associated with a second index of a first set.

A first mapped data element of two or more mapped data elements may be associated with a first index of a second set.

A second mapped data element of two or more mapped data elements may be associated with a second index of a second set.

At least two secret keys may be determined by at least two data elements of a first set of data elements.

A product involving at least two secret keys determined by at least two data elements of a first set of data elements may result in a public key.

In some embodiments, the method may further comprise receiving or accessing an encrypted message.

In some embodiments, the method may further comprise decrypting an encrypted message.

In some embodiments, a mapped public key may be mapped to a floating point number using a logarithmic based computing operation.

In some embodiments, a first set of data elements may comprise at least one of integer numbers, odd numbers, prime numbers, natural numbers, and/or real numbers.

In some embodiments, determining equivalence between a sum of the at least two mapped data elements of a second set of mapped data elements and a mapped public key comprises executing a data element selection operation based on a target computing operation result.

In some embodiments, a first set of data elements may be a previously generated set of data elements.

In some embodiments, a first set of data elements may comprise prime numbers and/or composite numbers.

A first set of data elements may comprise data elements in one of a decimal system, a binary system, a hexadecimal system, or any other number system.

In some embodiments, determining at least two data elements based on at least two secret keys comprises solving a subset sum problem.

Figure 5:
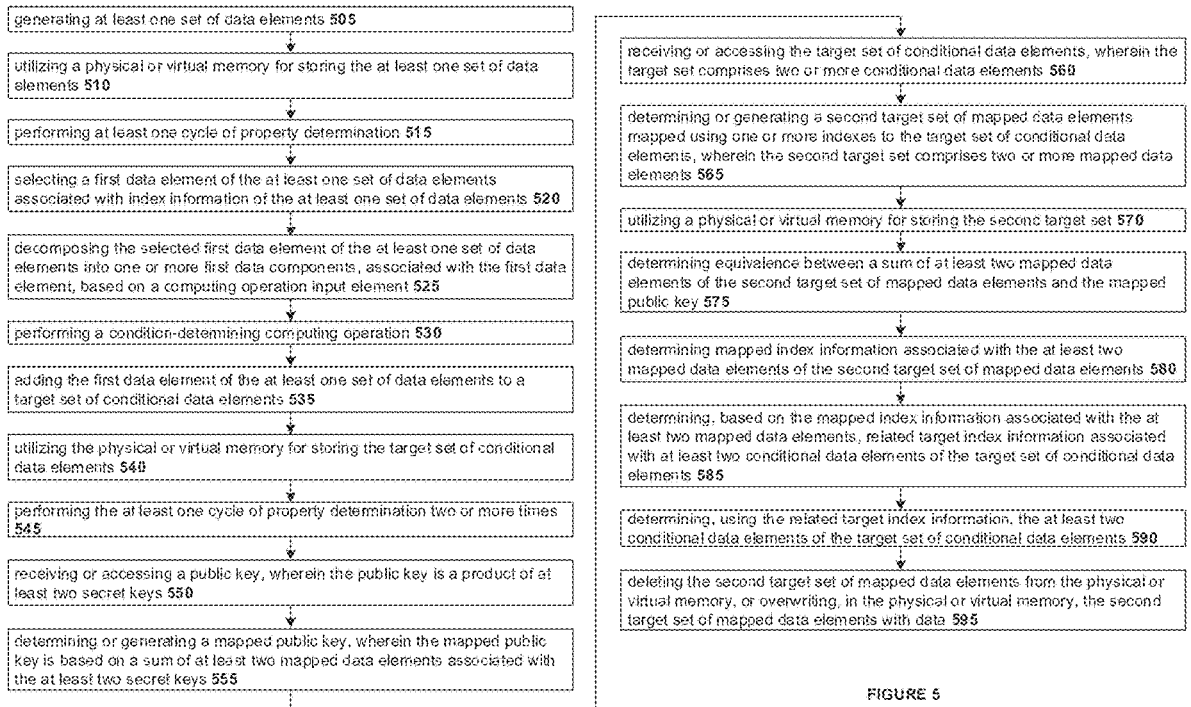
FIG. 5 is a method diagram for generating a set of data elements used in faster determination of keys for decryption, in accordance with some embodiments of the disclosure.

FIG. 5 describes an exemplary method generating a set of data elements used in faster determination of keys for decryption according to some embodiments of the disclosure. Any of the methods described herein may be executed in any order. One or more of the method steps may be optional. The method comprises generating at least one set of data elements 505; utilizing a physical or virtual memory for storing the at least one set of data elements 510; performing at least one cycle of property determination 515; selecting a first data element of the at least one set of data elements associated with index information of the at least one set of data elements 520; decomposing the selected first data element of the at least one set of data elements into one or more first data components, associated with the first data element, based on a computing operation input element 525; performing a condition-determining computing operation 530; adding the first data element of the at least one set of data elements to a target set of conditional data elements 535; utilizing the physical or virtual memory for storing the target set of conditional data elements 540; performing the at least on cycle of property determination two or more times 545; receiving or accessing a public key, wherein the public key is a product of at least two secret keys 550; determining or generating a mapped public key, wherein the mapped public key is based on a sum of at least two mapped data elements associated with the at least two secret keys 555; receiving or accessing the target set of conditional data elements, wherein the target set comprises two or more conditional data elements 560; determining or generating a second target set of mapped data elements mapped using one or more indexes to the target set of conditional data elements, wherein the second target set of mapped data elements comprises two or more mapped data elements 565; utilizing a physical or virtual memory for storing the second target set 570; determining equivalence between a sum of at least two mapped data elements of the second target set of mapped data elements and the mapped public key 575; determining mapped index information associated with the at least two mapped data elements of the second target set of mapped data elements 580; determining, based on the mapped index information associated with the at least two mapped data elements, related target index information associated with at least two conditional data elements of the target set of conditional data elements 585; determining, using the related target index information, the at least two conditional data elements of the target set of conditional data elements 590; deleting the second target set of mapped data elements from the physical or virtual memory, or overwriting, in the physical or virtual memory, the second target set of mapped data elements with data 595.

In some embodiments, at least one set of data elements may comprise one or more data elements resulting from one or more computing operations.

A first data element of one or more data elements of at least one set of data elements may be associated with a first index of the at least one set of data elements.

A computing operation input element of a first computing operation of one or more computing operations may be associated with a first index.

One or more first data components may be associated with a first index of at least one set of data elements.

A condition-determining computing operation may be associated with at least one property of prime numbers.

A condition-determining computing operation may comprise determining whether a first data element is a prime number.

A target set of conditional data elements may be associated with target index information.

Target index information may be related to index information of at least one set of data elements.

A target set of conditional data elements used for encryption or decryption may comprise conditionally selected data elements of at least one set of data elements.

A first conditional data element of two or more conditional data elements may be associated with a first target index of a target set.

A second conditional data element of two or more conditional data elements may be associated with a second target index of a target set.

A first mapped data element of two or more mapped data elements may be associated with a first mapped index of a second target set.

A second mapped data element of two or more mapped data elements may be associated with a second mapped index of a second target set.

At least two secret keys may be determined by at least two conditional data elements of a target set of conditional data elements.

A product involving at least two secret keys determined by at least two conditional data elements of a target set of conditional data elements may result in a public key.

In some embodiments, the method may further comprise receiving or accessing an encrypted message.

The method may further comprise decrypting an encrypted message.

In some embodiments, a mapped public key may be mapped to a floating point number using a logarithmic based computing operation.

In some embodiments, a set of data elements may comprise at least one of integer numbers, odd numbers, prime numbers, natural numbers, and/or real numbers.

In some embodiments, determining equivalence between a sum of the at least two mapped data elements of a second target set of mapped data elements and a mapped public key comprises executing a data element selection operation based on a target computing operation result.

Figure 6:
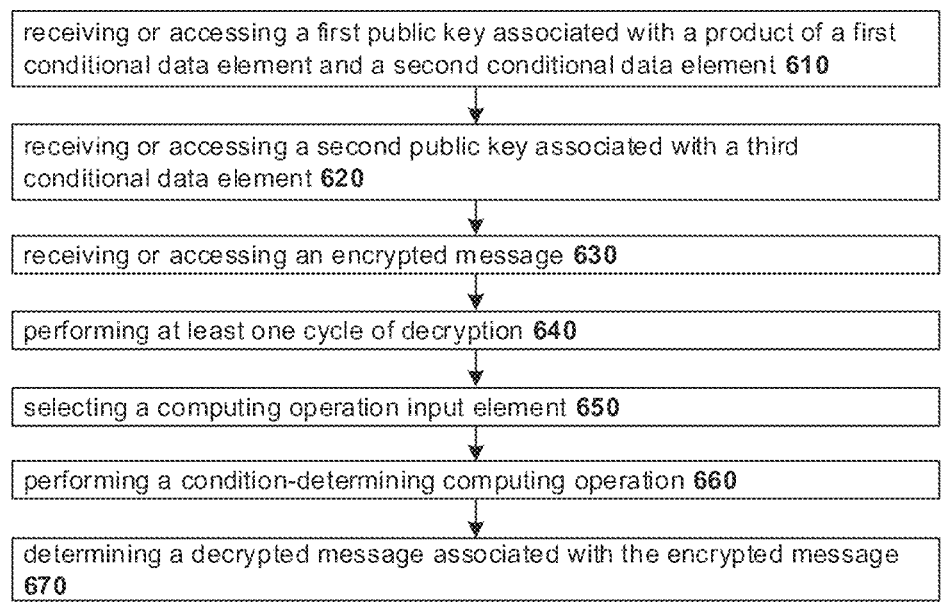
FIG. 6 is a method diagram for faster decryption of an encrypted message, in accordance with some embodiments of the disclosure.

FIG. 6 describes an exemplary method for faster decryption of an encrypted message associated with two public keys according to some embodiments of the disclosure. Any of the methods described herein may be executed in any order. One or more of the method steps may be optional. The method comprises receiving or accessing a first public key associated with a product of a first conditional data element and a second conditional data element 610; receiving or accessing a second public key associated with a third conditional data element 620; receiving or accessing an encrypted message 630; performing at least one cycle of decryption 640; selecting a computing operation input element 650; performing a condition-determining computing operation 660; determining a decrypted message associated with the encrypted message 670.

In some embodiments, a computing operation input element may be a natural number.

A condition-determining computing operation may comprise determining whether a computing operation result is an integer.

A computing operation result may be a decrypted message.

In some embodiments a condition-determining computing operation may comprise taking a nth root of a sum of: a product and an encrypted message, wherein the product comprises a computing operation input element and a first public key, wherein the computing operation input element is a variable natural number, and wherein n is associated with a second public key.

Figure 7:
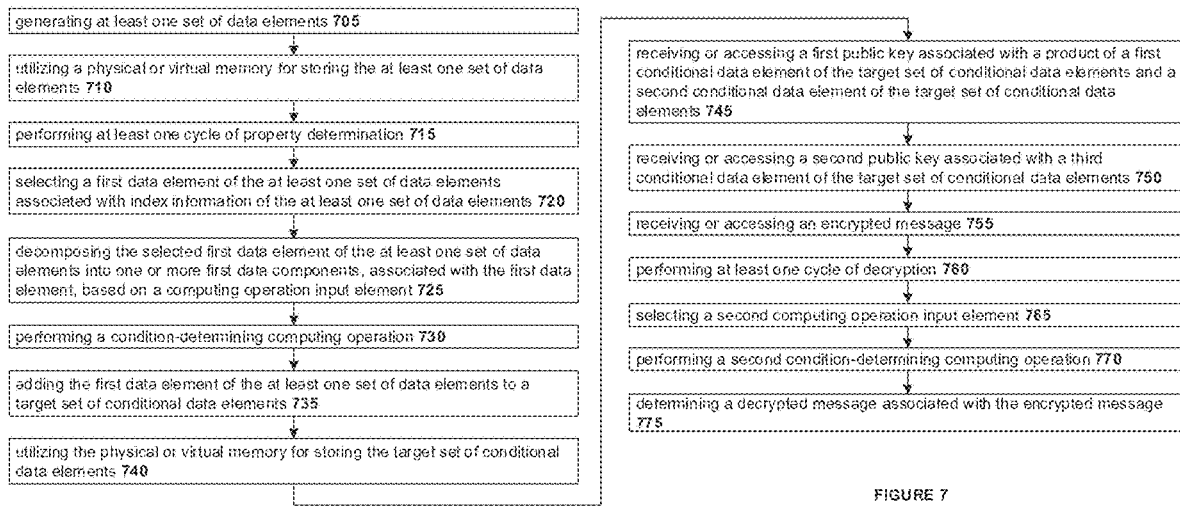
FIG. 7 is a method diagram for generating a set of data elements used in faster decryption of an encrypted message associated with two public keys, in accordance with some embodiments of the disclosure.

FIG. 7 describes an exemplary method generating a set of data elements used in faster decryption of an encrypted message associated with two public keys according to some embodiments of the disclosure. Any of the methods described herein may be executed in any order. One or more of the method steps may be optional. The method comprises generating at least one set of data elements 705; utilizing a physical or virtual memory for storing the at least one set of data elements 710; performing at least one cycle of property determination 715; selecting a first data element of the at least one set of data elements associated with index information of the at least one set of data elements 720; decomposing the selected first data element of the at least one set of data elements into one or more first data components, associated with the first data element, based on a computing operation input element 725; performing a condition-determining computing operation 730; adding the first data element of the at least one set of data elements to a target set of conditional data elements 735; utilizing the physical or virtual memory for storing the target set of conditional data elements 740; receiving or accessing a first public key associated with a product of a first conditional data element of the target set of conditional data elements and a second conditional data element of the target set of conditional data elements 745; receiving or accessing a second public key associated with a third conditional data element of the target set of conditional data elements 750; receiving or accessing an encrypted message 755; performing at least one cycle of decryption 760; selecting a second computing operation input element 765; performing a second condition-determining computing operation 770; determining a decrypted message associated with the encrypted message 775.

In some embodiments, at least one set of data elements may comprise one or more data elements resulting from one or more computing operations.

A first data element of one or more data elements of at least one set of data elements may be associated with a first index of the at least one set of data elements.

A computing operation input element of a first computing operation of one or more computing operations may be associated with a first index.

One or more first data components may be associated with a first index of at least one set of data elements.

A condition-determining computing operation may be associated with at least one property of prime numbers.

A condition-determining computing operation may comprise determining whether a first data element is a prime number.

A target set of conditional data elements may be associated with target index information.

Target index information may be related to index information of at least one set of data elements.

A target set of conditional data elements used for encryption or decryption may comprise conditionally selected data elements of at least one set of data elements.

A second computing operation input element may be a natural number.

A second condition-determining computing operation may comprise determining whether a computing operation result is an integer.

A computing operation result may be a decrypted message.

In some embodiments a second condition-determining computing operation may comprise taking a nth root of a sum of: a product and an encrypted message, wherein the product comprises a second computing operation input element and a first public key, wherein the second computing operation input element is a variable natural number, and wherein n is associated with a second public key.

A new method for factorizing a number is developed based on the solution of the subset sum problem, and encryption-decryption methods are disclosed with a significantly reduced time for the encryption-decryption process.

The proposed encryption-decryption methods make it possible to design efficient computer cryptosystems with an open public key and with private key based cryptosystems. The proposed cryptosystems can be used not only by modern computers, but also by supercomputers with equal efficiency.

The disclosure improves the crypto-stability of cryptographic systems/to increase the efficiency (in terms of speed and required hardware capacity) of decryption of messages and data encrypted using cryptosystems. Applying the disclosure herein makes the cryptosystems more secure.

The disclosure allows the creation of more secure new public-key and private-key based cryptography, which can be applied in areas, including but not limited to:

encryption of data during their transmission over open communication channels, for example, via the Internet, telephone or other is made more secure;

more secure encryption of information systems and/or data bases and/or data to protect against unauthorized access;

more secure cyber security for banking systems including, but not limited: cyber security during transaction with plastic cards, ATM, pos-terminals, on-line payments for individuals; cyber security when providing banking services for legal entities, public organizations, states via open/private communication channels etc.; for example a processing center decrypts an encrypted pin code and gives access to use a card;

improved cyber security for digital currencies, including secured digital currency transfer, secured digital currency storage, secured verifying authenticity of transmitted digital currency, secured verifying source of transmitted digital currency etc.; for example a mined bitcoin is encrypted by RSA standard and then sent to a processing center;

effective solution of blockchain trilemma, based on the trilemma solution improvement of effectiveness of cryptocurrencies or digital tokens or creation of new effectively scalable and cyber protected cryptocurrencies or digital tokens;

improved cyber protection for electronic document flow;

improvement of or creation of new antivirus software, making it more secure;

creation of more secure information systems for verifying the authenticity of transmitted messages/data, the integrity of the transmitted messages/data and the source of creation/forwarding The disclosure may be used for development and training of quantum systems, training of neural networks and improvement of other methods of working with information by using decryption, encryption, or other methods described herein.

The disclosure may be used to perform security checks on a computer system of a company.

The disclosure may be used to provide more resilient encryption of a signal between an operator and a remote controlled device. For example a car, a drone, etc.

Any embodiment described in this disclosure can be combined with any other embodiment described in this disclosure. This "disclosure" also includes any patents/applications incorporated by reference herein.

This application incorporates by reference the following patents/applications: U.S. Pat. No. 10,394,555 filed Dec. 17, 2018, U.S. Pat. No. 10,860,317 filed Dec. 12, 2019, and PCT/IB2019/001297 filed Dec. 10, 2019.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present disclosure may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems.

The term signal, signals, or data may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation."

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the disclosure(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosure(s) set out in any claims that may issue from this disclosure. Specifically, a description of a technology in the "Background" is not to be construed as an admission that technology is prior art to any disclosure(s) in this disclosure. Neither is the "Summary" to be considered as a characterization of the disclosure(s) set forth in issued claims. Furthermore, any reference in this disclosure to "disclosure" or "invention" in the singular should not be used to argue that there is only a single point of novelty in this disclosure. Multiple disclosures may be set forth according to the limitations of the multiple claims issuing from this disclosure, and such claims accordingly define the disclosure(s), and their equivalents, that are protected thereby. In all instances, the scope of such claims shall be considered on their own merits in light of this disclosure, but should not be constrained by the headings herein.

The invention claimed is:

1. A method for generating a set of data elements for resilient decryption, the method comprising:
generating, using one or more computing device processors, at least one set of data elements,
wherein the at least one set of data elements comprises one or more data elements resulting from one or more computing operations,
wherein a first data element of the one or more data elements of the at least one set of data elements is associated with a first index of the at least one set of data elements,
wherein a computing operation input element of a first computing operation of the one or more computing operations is associated with the first index;
utilizing, using the one or more computing device processors, a physical or virtual memory for storing the at least one set of data elements;
performing, using the one or more computing device processors, at least one cycle of property determination, wherein the at least one cycle of property determination comprises:
selecting, using the one or more computing device processors, the first data element of the at least one set of data elements associated with index information of the at least one set of data elements;
decomposing, using the one or more computing device processors, the selected first data element of the at least one set of data elements into one or more first data components, associated with the first data element, based on the computing operation input element,
wherein the one or more first data components are associated with the first index of the at least one set of data elements;
performing, using the one or more computing device processors, a condition-determining computing operation, wherein the condition-determining computing operation is associated with at least one property of prime numbers;
in response to determining the first data element of the at least one set of data elements and the one or more first data components associated with the selected first data element fulfill a condition associated with the at least one property of prime numbers:
adding, using the one or more computing device processors, the first data element of the at least one set of data elements to a target set of conditional data elements, wherein the target set of conditional data elements is associated with target index information, wherein the target index information is related to the index information of the at least one set of data elements;
utilizing, using the one or more computing device processors, the physical or virtual memory for storing the target set of conditional data elements,
wherein the target set of conditional data elements used for decryption comprises conditionally selected data elements of the at least one set of data elements;
receiving or accessing, using the one or more computing device processors, a first public key associated with a product of a first conditional data element of the target set of conditional data elements and a second conditional data element of the target set of conditional data elements;
receiving or accessing, using the one or more computing device processors, a second public key associated with a third conditional data element of the target set of conditional data elements;
receiving or accessing, using the one or more computing device processors, an encrypted message;
performing, using the one or more computing device processors, at least one cycle of decryption, the at least one cycle of decryption comprising:
selecting, using the one or more computing device processors, a second computing operation input element, wherein the second computing operation input element is a natural number;
performing, using the one or more computing device processors, and using the first public key and the second public key, a second condition-determining computing operation, wherein the second condition-determining computing operation comprises determining whether a computing operation result associated with the second condition-determining computing operation is an integer;
in response to determining the computing operation result associated with the second condition-determining computing operation is an integer:
determining, using the one or more computing device processors, a decrypted message associated with the encrypted message, wherein the computing operation result associated with the second condition-determining computing operation is the decrypted message.

2. The method of claim 1, wherein the at least one cycle of property determination is performed for every data element of the at least one set of data elements.

3. The method of claim 1, further comprising:
receiving or determining, using the one or more computing device processors, an intermediate computing operation result,
wherein the intermediate computing operation result is based on an intermediate computing operation associated with the first data element of the at least one set of data elements,
wherein the intermediate computing operation result associated with the first data element of the at least one set of data elements is related to the first computing operation of the one or more computing operations,
wherein the intermediate computing operation result is associated with the first index of the at least one set of data elements, and
wherein the intermediate computing operation result is associated with the computing operation input element.

4. The method of claim 1, wherein the condition is considered fulfilled when at least one of the following fails:
the selected first data element of the at least one set of data elements comprises a difference between a square of a first data component and a square of a second data component, and added a third data component,
wherein the first data component is greater than the second data component,
wherein the third data component is equal to or greater than the square of the second data component, and wherein at least one of the first data component, the second data component, or the third data component is a natural number, wherein natural numbers comprise zero, or a difference between the third data component and a square of the second data component equals a product of the first data component and a fourth data component, wherein the first data component is greater than the second data component, wherein the third data component is equal to or greater than the square of the second data component, and wherein at least one of the first data component, the second data component, or the third data component is a natural number, wherein natural numbers comprise zero.

5. The method of claim 1, wherein the one or more data elements of the at least one set of data elements are derived by a sum of: a product and a fixed component, wherein the product comprises a pre-determined integer number and the computing operation input element, wherein the fixed component is either a positive integer or a negative integer, and wherein the computing operation input element is a variable integer number.

6. The method of claim 1, wherein the at least one set of data elements comprises prime numbers and composite numbers, wherein the at least one set of data elements is mapped to a floating point number set using a logarithmic based computing operation, or wherein the at least one set of data elements comprises data elements in one of a decimal system, a binary system, or a hexadecimal system.

7. The method of claim 1, further comprising:

performing, using the one or more computing device processors, the at least one cycle of property determination two or more times;

receiving or accessing, using the one or more computing device processors, a public key, wherein the public key is a product of at least two secret keys;

determining or generating, using the one or more computing device processors, a mapped public key, wherein the mapped public key is based on a sum of at least two mapped data elements associated with the at least two secret keys;

receiving or accessing, using the one or more computing device processors, the target set of conditional data elements, wherein the target set of conditional data elements comprises two or more conditional data elements, wherein a first conditional data element of the two or more conditional data elements is associated with a first target index of the target set, and wherein a second conditional data element of the two or more conditional data elements is associated with a second target index of the target set;

determining or generating, using the one or more computing device processors, a second target set of mapped data elements mapped using one or more indexes to the target set of conditional data elements, wherein the second target set of mapped data elements comprises two or more mapped data elements, wherein a first mapped data element of the two or more mapped data elements is associated with a first mapped index of the second target set, and wherein a second mapped data element of the two or more mapped data elements is associated with a second mapped index of the second target set;

utilizing the physical or virtual memory for storing the second target set;

determining, using the one or more computing device processors, equivalence between a sum of at least two mapped data elements of the second target set of mapped data elements and the mapped public key;

determining, using the one or more computing device processors, mapped index information associated with the at least two mapped data elements of the second target set of mapped data elements;

determining, using the one or more computing device processors, and based on the mapped index information associated with the at least two mapped data elements of the second target set of mapped data elements, related target index information associated with at least two conditional data elements of the target set of conditional data elements;

determining, using the one or more computing device processors, and using the related target index information associated with the at least two conditional data elements of the target set of conditional data elements, the at least two conditional data elements of the target set of conditional data elements, wherein the at least two secret keys are determined by the at least two conditional data elements of the target set of conditional data elements, and wherein the product involving the at least two secret keys determined by the at least two conditional data elements of the target set of conditional data elements results in the public key; and deleting the second target set of mapped data elements from the physical or virtual memory, or overwriting, in the physical or virtual memory, the second target set of mapped data elements with data.

8. The method of claim 7, further comprising:

receiving or accessing the encrypted message;

decrypting, using the at least two secret keys, the encrypted message.

9. The method of claim 7, wherein the mapped public key is mapped to a floating point number using a logarithmic based computing operation.

10. A method for generating a set of data elements for resilient decryption, the method comprising:

generating, using one or more computing device processors, at least one set of data elements, wherein the at least one set of data elements comprises one or more data elements resulting from one or more computing operations, wherein a first data element of the one or more data elements of the at least one set of data elements is associated with a first index of the at least one set of data elements, wherein a computing operation input element of a first computing operation of the one or more computing operations is associated with the first index;

utilizing, using the one or more computing device processors, a physical or virtual memory for storing the at least one set of data elements;

performing, using the one or more computing device processors, at least one cycle of property determination, wherein the at least one cycle of property determination comprises:

selecting, using the one or more computing device processors, the first data element of the at least one set of data elements associated with index information of the at least one set of data elements;

decomposing, using the one or more computing device processors, the selected first data element of the at least one set of data elements into one or more first data components, associated with the first data element, based on the computing operation input element,
    wherein the one or more first data components are associated with the first index of the at least one set of data elements;
performing, using the one or more computing device processors, a condition-determining computing operation, wherein the condition-determining computing operation is associated with at least one property of prime numbers;
in response to determining the first data element of the at least one set of data elements and the one or more first data components associated with the selected first data element do not fulfill a condition associated with the at least one property of prime numbers:
    adding, using the one or more computing device processors, the first data element of the at least one set of data elements to a target set of conditional data elements, wherein the target set of conditional data elements is associated with target index information, wherein the target index information is related to the index information of the at least one set of data elements;
utilizing, using the one or more computing device processors, the physical or virtual memory for storing the target set of conditional data elements,
wherein the target set of conditional data elements used for decryption comprises conditionally selected data elements of the at least one set of data elements;
receiving or accessing, using the one or more computing device processors, a first public key associated with a product of a first conditional data element of the target set of conditional data elements and a second conditional data element of the target set of conditional data elements;
receiving or accessing, using the one or more computing device processors, a second public key associated with a third conditional data element of the target set of conditional data elements;
receiving or accessing, using the one or more computing device processors, an encrypted message;
performing, using the one or more computing device processors, at least one cycle of decryption, the at least one cycle of decryption comprising:
    selecting, using the one or more computing device processors, a second computing operation input element, wherein the second computing operation input element is a natural number;
    performing, using the one or more computing device processors, and using the first public key and the second public key, a second condition-determining computing operation, wherein the second condition-determining computing operation comprises determining whether a computing operation result associated with the second condition-determining computing operation is an integer;
    in response to determining the computing operation result associated with the second condition-determining computing operation is an integer:
        determining, using the one or more computing device processors, a decrypted message associated with the encrypted message, wherein the computing operation result associated with the second condition-determining computing operation is the decrypted message.

11. The method of claim 10, wherein the at least one cycle of property determination is performed for every data element of the at least one set of data elements.

12. The method of claim 10, further comprising:
receiving or determining, using the one or more computing device processors, an intermediate computing operation result,
    wherein the intermediate computing operation result is based on an intermediate computing operation associated with the first data element of the at least one set of data elements,
    wherein the intermediate computing operation result associated with the first data element of the at least one set of data elements is related to the first computing operation of the one or more computing operations,
    wherein the intermediate computing operation result is associated with the first index of the at least one set of data elements, and
    wherein the intermediate computing operation result is associated with the computing operation input element.

13. The method of claim 10, wherein the condition is considered fulfilled when at least one of the following is fulfilled:
the selected first data element of the at least one set of data elements comprises a difference between a square of a first data component and a square of a second data component, and added a third data component,
    wherein the first data component is greater than the second data component,
    wherein the third data component is equal to or greater than the square of the second data component, and
    wherein the first data component, the second data component, and the third data component is a natural number, wherein natural numbers comprise zero, or
a difference between the third data component and a square of the second data component equals a product of the first data component and a fourth data component,
    wherein the first data component is greater than the second data component,
    wherein the third data component is equal to or greater than the square of the second data component, and
    wherein the first data component, the second data component, the third data component, and the fourth data component is a natural number, wherein natural numbers comprise zero.

14. The method of claim 10, wherein the one or more data elements of the at least one set of data elements are derived by a sum of: a product and a fixed component, wherein the product comprises a pre-determined integer number and the computing operation input element, wherein the fixed component is either a positive integer or a negative integer, and wherein the computing operation input element is a variable integer number.

15. The method of claim 10, further comprising:
performing, using the one or more computing device processors, the at least one cycle of property determination two or more times;
receiving or accessing, using the one or more computing device processors, a public key, wherein the public key is a product of at least two secret keys;

determining or generating, using the one or more computing device processors, a mapped public key, wherein the mapped public key is based on a sum of at least two mapped data elements associated with the at least two secret keys;

receiving or accessing, using the one or more computing device processors, the target set of conditional data elements, wherein the target set of conditional data elements comprises two or more conditional data elements, wherein a first conditional data element of the two or more conditional data elements is associated with a first target index of the target set, and wherein a second conditional data element of the two or more conditional data elements is associated with a second target index of the target set;

determining or generating, using the one or more computing device processors, a second target set of mapped data elements mapped using one or more indexes to the target set of conditional data elements, wherein the second target set of mapped data elements comprises two or more mapped data elements, wherein a first mapped data element of the two or more mapped data elements is associated with a first mapped index of the second target set, and wherein a second mapped data element of the two or more mapped data elements is associated with a second mapped index of the second target set;

utilizing the physical or virtual memory for storing the second target set;

determining, using the one or more computing device processors, equivalence between a sum of at least two mapped data elements of the second target set of mapped data elements and the mapped public key;

determining, using the one or more computing device processors, mapped index information associated with the at least two mapped data elements of the second target set of mapped data elements;

determining, using the one or more computing device processors, and based on the mapped index information associated with the at least two mapped data elements of the second target set of mapped data elements, related target index information associated with at least two conditional data elements of the target set of conditional data elements;

determining, using the one or more computing device processors, and using the related target index information associated with the at least two conditional data elements of the target set of conditional data elements, the at least two conditional data elements of the target set of conditional data elements,
wherein the at least two secret keys are determined by the at least two conditional data elements of the target set of conditional data elements, and
wherein the product involving the at least two secret keys determined by the at least two conditional data elements of the target set of conditional data elements results in the public key; and deleting the second target set of mapped data elements from the physical or virtual memory, or overwriting, in the physical or virtual memory, the second target set of mapped data elements with data.

16. The method of claim 15, further comprising:
receiving or accessing the encrypted message;
decrypting, using the at least two secret keys, the encrypted message.

17. The method of claim 15, wherein the mapped public key is mapped to a floating point number using a logarithmic based computing operation, or
wherein the target set of conditional data elements comprises at least one of integer numbers, odd numbers, prime numbers, natural numbers, or real numbers.

18. The method of claim 15, wherein the determining equivalence between a sum of the at least two mapped data elements of the second target set of mapped data elements and the mapped public key comprises executing a data element selection operation based on a target computing operation result.

19. A method for generating a set of data elements for resilient decryption, the method comprising:
generating, using one or more computing device processors, at least one set of data elements,
wherein the at least one set of data elements comprises one or more data elements resulting from one or more computing operations,
wherein a first data element of the one or more data elements of the at least one set of data elements is associated with a first index of the at least one set of data elements,
wherein a computing operation input element of a first computing operation of the one or more computing operations is associated with the first index;
utilizing, using the one or more computing device processors, a physical or virtual memory for storing the at least one set of data elements;
performing, using the one or more computing device processors, at least one cycle of property determination, wherein the at least one cycle of property determination comprises:
selecting, using the one or more computing device processors, the first data element of the at least one set of data elements associated with index information of the at least one set of data elements;
decomposing, using the one or more computing device processors, the selected first data element of the at least one set of data elements into one or more first data components, associated with the first data element, based on the computing operation input element,
wherein the one or more first data components are associated with the first index of the at least one set of data elements;
performing, using the one or more computing device processors, a condition-determining computing operation, wherein the condition-determining computing operation is associated with at least one property of prime numbers;
in response to determining the first data element of the at least one set of data elements and the one or more first data components associated with the selected first data element fulfill a condition associated with the at least one property of prime numbers:
adding, using the one or more computing device processors, the first data element of the at least one set of data elements to a target set of conditional data elements, wherein the target set of conditional data elements is associated with target index information, wherein the target index information is related to the index information of the at least one set of data elements;
utilizing, using the one or more computing device processors, the physical or virtual memory for storing the target set of conditional data elements, wherein the target set of conditional data elements used for decryption comprises conditionally selected data elements of the at least one set of data elements;

performing, using the one or more computing device processors, the at least one cycle of property determination two or more times;

receiving or accessing, using the one or more computing device processors, a public key, wherein the public key is a product of at least two secret keys;

determining or generating, using the one or more computing device processors, a mapped public key, wherein the mapped public key is based on a sum of at least two mapped data elements associated with the at least two secret keys;

receiving or accessing, using the one or more computing device processors, the target set of conditional data elements, wherein the target set of conditional data elements comprises two or more conditional data elements, wherein a first conditional data element of the two or more conditional data elements is associated with a first target index of the target set, and wherein a second conditional data element of the two or more conditional data elements is associated with a second target index of the target set;

determining or generating, using the one or more computing device processors, a second target set of mapped data elements mapped using one or more indexes to the target set of conditional data elements, wherein the second target set of mapped data elements comprises two or more mapped data elements, wherein a first mapped data element of the two or more mapped data elements is associated with a first mapped index of the second target set, and wherein a second mapped data element of the two or more mapped data elements is associated with a second mapped index of the second target set;

utilizing the physical or virtual memory for storing the second target set;

determining, using the one or more computing device processors, equivalence between a sum of at least two mapped data elements of the second target set of mapped data elements and the mapped public key;

determining, using the one or more computing device processors, mapped index information associated with the at least two mapped data elements of the second target set of mapped data elements;

determining, using the one or more computing device processors, and based on the mapped index information associated with the at least two mapped data elements of the second target set of mapped data elements, related target index information associated with at least two conditional data elements of the target set of conditional data elements;

determining, using the one or more computing device processors, and using the related target index information associated with the at least two conditional data elements of the target set of conditional data elements, the at least two conditional data elements of the target set of conditional data elements,
  wherein the at least two secret keys are determined by the at least two conditional data elements of the target set of conditional data elements, and
  wherein the product involving the at least two secret keys determined by the at least two conditional data elements of the target set of conditional data elements results in the public key;

deleting the second target set of mapped data elements from the physical or virtual memory, or overwriting, in the physical or virtual memory, the second target set of mapped data elements with data;

receiving or accessing an encrypted message; and decrypting, using the at least two secret keys, the encrypted message.

20. The method of claim 19, wherein the condition is considered fulfilled when at least one of the following fails:

the selected first data element of the at least one set of data elements comprises a difference between a square of a first data component and a square of a second data component, and added a third data component, wherein the first data component is greater than the second data component, wherein the third data component is equal to or greater than the square of the second data component, and wherein at least one of the first data component, the second data component, or the third data component is a natural number, wherein natural numbers comprise zero, or a difference between the third data component and a square of the second data component equals a product of the first data component and a fourth data component, wherein the first data component is greater than the second data component, wherein the third data component is equal to or greater than the square of the second data component, and wherein at least one of the first data component, the second data component, the third data component, or the fourth data component is a natural number, wherein natural numbers comprise zero.

* * * * *